US010396518B2

(12) United States Patent
Merical et al.

(10) Patent No.: US 10,396,518 B2

(45) Date of Patent: Aug. 27, 2019

(54) CABLE GRIPPER TOOL

(71) Applicants: Edward L. Merical, Canal Fulton, OH (US); Christopher Robert Cummings, Newton Falls, OH (US)

(72) Inventors: Edward L. Merical, Canal Fulton, OH (US); Christopher Robert Cummings, Newton Falls, OH (US)

(73) Assignee: PDS Electronics, Inc., Tallmadge, OH (US)

( * ) Notice: Subject to any disclaimer, the term of this patent is extended or adjusted under 35 U.S.C. 154(b) by 190 days.

(21) Appl. No.: 14/712,383

(22) Filed: May 14, 2015

(65) Prior Publication Data

US 2015/0333464 A1 Nov. 19, 2015

Related U.S. Application Data

(60) Provisional application No. 61/993,042, filed on May 14, 2014.

(51) Int. Cl.

| | |
|---|---|
| ***B23P 19/00*** | (2006.01) |
| ***H01R 43/00*** | (2006.01) |
| ***H01R 43/01*** | (2006.01) |
| ***H01R 9/05*** | (2006.01) |
| *H01R 24/40* | (2011.01) |

(52) U.S. Cl.

CPC ............. *H01R 43/015* (2013.01); *H01R 9/05* (2013.01); *H01R 9/0521* (2013.01); *H01R 24/40* (2013.01); *Y10T 29/53213* (2015.01)

(58) Field of Classification Search

CPC ...... H01R 9/05; H01R 43/015; H01R 9/0521; H01R 24/40; B29D 23/001; B65H 75/441; Y10T 29/53213; Y10T 29/53257; B25B 7/00; B25B 7/02; B25B 9/00

USPC .......... 29/450, 729, 747, 760, 748; 138/110, 138/128; 269/287, 288, 258; 81/423

See application file for complete search history.

(56) References Cited

U.S. PATENT DOCUMENTS

| | | | | |
|---|---|---|---|---|
| 1,435,311 A * | 11/1922 | Knight | B29D 23/001 29/450 |
| 4,386,800 A | 6/1983 | Stegall | |
| 4,522,055 A | 6/1985 | Berger | |
| 4,821,610 A * | 4/1989 | Redmon, Jr. | B25B 7/02 269/258 |
| 4,953,862 A * | 9/1990 | Uke | A63B 60/10 473/206 |
| 5,304,075 A | 4/1994 | Hoffman | |
| 5,305,669 A * | 4/1994 | Kimbro | B25B 7/00 81/423 |
| 5,387,021 A | 2/1995 | Brewer | |
| 5,992,010 A | 11/1999 | Zamanzadeh | |
| 6,315,001 B1 * | 11/2001 | Anderson | B65H 75/441 138/110 |
| 6,471,268 B1 * | 10/2002 | Stenstrom | B25B 9/00 16/421 |

(Continued)

*Primary Examiner* — Donghai D Nguyen

(74) *Attorney, Agent, or Firm* — Fay Sharpe LLP

(57) ABSTRACT

Disclosed is a cable gripping device used for manually gripping a coaxial cable to install a coaxial connector on the coaxial cable. According to an exemplary embodiment, the coaxial gripping tool includes a first half portion and a mating and/or hinged second half portion, wherein the mating/hinged portions provide a longitudinal bore configured to grip the coaxial cable.

6 Claims, 8 Drawing Sheets

(56) References Cited

U.S. PATENT DOCUMENTS

| | | | | |
|---|---|---|---|---|
| 6,918,205 | B1 * | 7/2005 | Sowinski | A01G 1/06 269/287 |
| 6,938,522 | B1 | 9/2005 | Stannik | |
| 7,181,999 | B1 | 2/2007 | Skeels et al. | |
| 8,701,278 | B2 | 4/2014 | Merical | |
| 2009/0019704 | A1 | 1/2009 | Ehret et al. | |
| 2010/0170090 | A1 | 7/2010 | Rodrigues | |
| 2012/0192414 | A1 | 8/2012 | Montena et al. | |
| 2013/0086969 | A1 | 4/2013 | Wilson et al. | |
| 2014/0201987 | A1 | 7/2014 | Merical | |

* cited by examiner

NOTES:
1. MATERIAL: GEON M4300 CLEAR PVC.
   COLOR: GPCX-4000 DARK GREEN
2. DIMENSIONS IN INCHES

NOTES:

1. MATERIAL: GEON M4300 CLEAR PVC.
   COLOR: GPCX-4000 DARK GREEN

2. DIMENSIONS IN INCHES

NOTES:

1. MATERIAL: GEON M4300 CLEAR PVC.
   COLOR: GPCX-4000 DARK GREEN

2. DIMENSIONS IN INCHES

NOTES:

1. MATERIAL: GEON M4300 CLEAR PVC.
   COLOR: GPCX-4000 DARK GREEN

2. DIMENSIONS IN INCHES

CABLE GRIPPER TOOL

This is application claims priority to U.S. Provisional Patent Application Ser. No. 61/993,042, filed May 14, 2014, by Edward L. Merical et al., entitled "CABLE GRIPPER TOOL", the disclosure of which is hereby incorporated by reference in its entirety.

BACKGROUND

Attaching electrical connectors to a coaxial cable has always been a tedious task. Typical of such connectors are those known as PL-259 UHF connectors or Type N connectors. These connectors have an internally threaded body which must be attached to the outside casing, which is usually made of rubber or a like material, of a coaxial cable. To effect the attachment, the body of the connector is placed adjacent to the casing and is grasped by the user and turned to actually cut threads into the coaxial cable casing material. Alternatively, one can turn the connector and cut threads in the coaxial cable casing. Care must be taken so as not to thread the connector too far onto the cable because such could well damage the connector.

U.S. Pat. No. 8,701,278, issued Apr. 22, 2014 by Edward L. Merical and entitled "METHOD FOR ATTACHING A CONNECTOR TO A PREPARED COAXIAL CABLE" and U.S. Patent Application Publication No. 2014/0201987, published Jul. 24, 2014, by Edward L. Merical and entitled "DEVICE FOR ATTACHING A CONNECTOR TO A PREPARED COAXIAL CABLE" provide a method and device to attach connections to a coaxial cable with minimal effort. However, a need exists for a device which can be used to manually grasp a coaxial cable in order to prepare the coaxial cable to attach a connector and/or manually grasp the coaxial cable in order to attach the connector.

INCORPORATION BY REFERENCE

U.S. Pat. No. 8,701,278, issued Apr. 22, 2014 by Edward L. Merical and entitled "METHOD FOR ATTACHING A CONNECTOR TO A PREPARED COAXIAL CABLE" and U.S. Patent Application Publication No. 2014/0201987, published Jul. 24, 2014, by Edward L. Merical and entitled "DEVICE FOR ATTACHING A CONNECTOR TO A PREPARED COAXIAL CABLE", are incorporated herein by reference in their entirety.

BRIEF DESCRIPTION

In one embodiment of this disclosure, described is a coaxial cable gripping device comprising: a body including an internal longitudinal bore configured to receive a section of coaxial cable, the body including a first half portion and a mating second half portion, wherein one or more of the first half portion and second half portion include an external gripping surface disposed on the outside of the body and an internal gripping surface disposed on the internal longitudinal bore and configured to grasp an outer surface of the coaxial cable.

DETAILED DESCRIPTION

Figure 1:
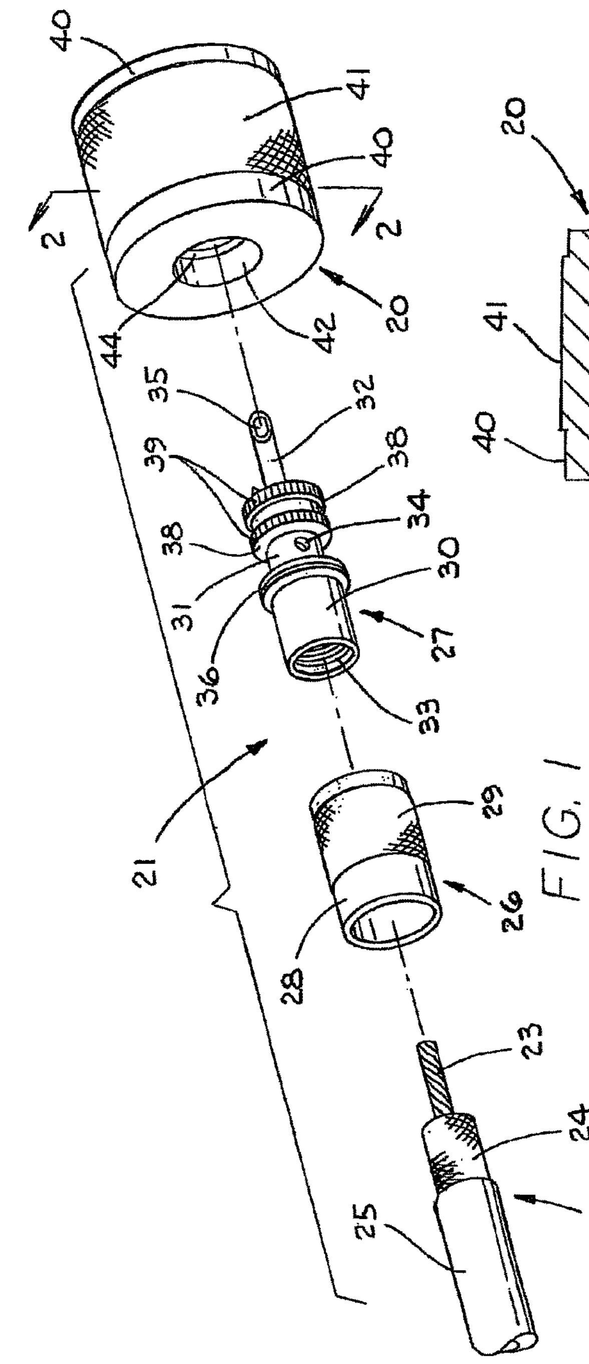
FIG. 1 (PRIOR ART)
FIG. 1 is an exploded perspective view of a prepared cable, connector component and connector tool.
Figure 2:
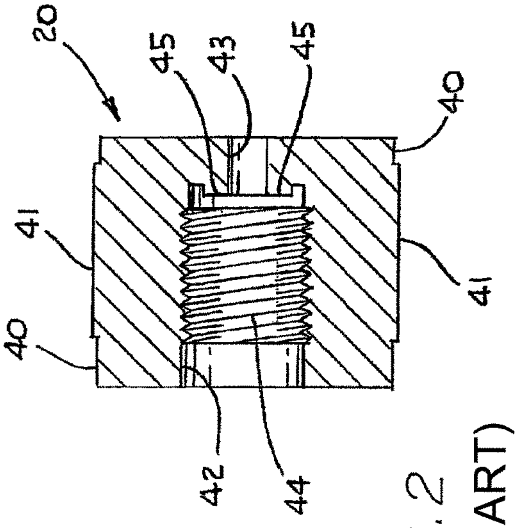
FIG. 2 (PRIOR ART)
FIG. 2 is a sectional view of the device taken substantially along line 2-2 of FIG. 1.

A connector installation device according to U.S. Pat. No. 8,701,278, issued Apr. 22, 2014 by Edward L. Merical and entitled "METHOD FOR ATTACHING A CONNECTOR TO A PREPARED COAXIAL CABLE" and U.S. patent application Ser. No. 14/221,557, filed Mar. 21, 2014, by Edward L. Merical and entitled "DEVICE FOR ATTACHING A CONNECTOR TO A PREPARED COAXIAL CABLE" is indicated generally by the numeral 20 in FIG. 1 and is used to assist in connection of an electrical connector, generally indicated by the numeral 21, to a prepared coaxial cable generally indicated by the numeral 22.

Coaxial cables 22 are known in the art as having a central wire 23 and a wire sheath 24 spaced from wire 23. A plastic or other insulating sleeve (not shown) is positioned between wire 23 and sheath 24 to electrically isolate the same. Sheath 24 is covered by a durable casing 25 made of rubber or a like plastic or synthetic material.

The connector 21 shown in FIG. 1 is a conventional uhf connector, known in the art as a PL-259 connector, which includes a shell generally indicated by the numeral 26 and a connector body generally indicated by the numeral 27. Shell 26, which is sometimes known in the art as a barrel, is in the form of a hollow cylindrical tube 28 which can have an outer textured surface 29 for ease of gripping. Connector body 27 is hollow and includes a generally cylindrical base portion 30 of an internal diameter approximating the external diameter of cable casing 25; a cylindrical intermediate portion 31 communicating with the base portion 30 and having an internal diameter approximating the external diameter of the cable sheath 25, and a cylindrical tip portion 32 communicating with the intermediate portion 31 and having an internal diameter approximating the external diameter of the cable central wire 23. The front face (not shown) of intermediate portion 31 is provided with a dielectric seal extending from the outer surface of tip portion 32 to the inside surface of intermediate portion 31. It is important that this seal not be broken as could often happen if connector body 27 were over tightened onto cable 22 by methods of the prior art.

The base portion 30 is provided with internal threads 33 which, as will hereinafter be described in more detail, are adapted to engage cable casing 25. Intermediate portion 31 is provided with a hole 34 so that when cable sheath 24 is positioned therein, sheath 24 may be soldered to connector body 27. Similarly, tip portion 32 has an open end 35 so that the cable wire 23 positioned in tip portion 32 and exposed at open end 35 may be soldered to tip portion 32.

Figure 4:
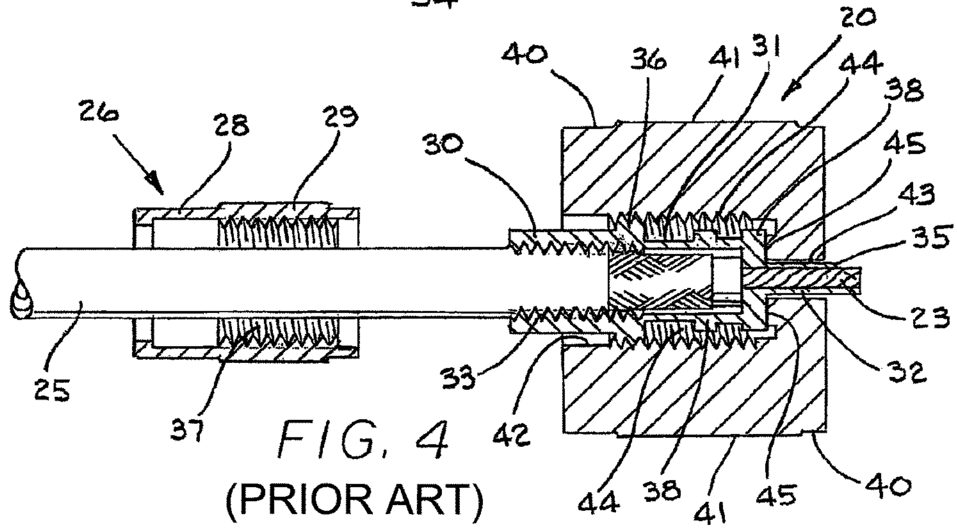
FIG. 4 (PRIOR ART)
FIG. 4 is a view like FIG. 3 but showing the connector in the device and attached to the cable.
Figure 5:
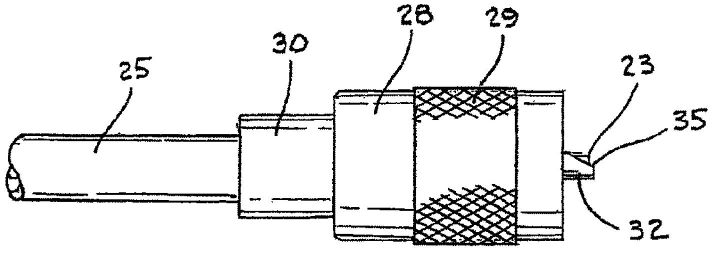
FIG. 5 (PRIOR ART)
FIG. 5 is an elevational view of the connector on the cable.

The end of base portion 30 adjacent to intermediate portion 31 is provided with an externally threaded collar 36. Connector shell 26 is provided with internal threads 37 (FIG. 4) which may engage threaded collar 36 and be attached to connector body 27 as shown in FIG. 5. The intermediate portion 31 of connector body 27 is typically provided with flanges 38 having a knurled outer surface 39. In a conventional connector such as connector 21, flanges 38 can be gripped and connector body 27 turned to allow the threads 33 of base portion 30 to cut threads into the cable casing 25 to attach the connector body 27 to the casing 25. However, flanges 38 of a conventional connector are no longer necessary in view of the device 20 now to be described.

Connector installation device 20 can be made of a metallic material and is formed with a body having a generally cylindrical outer surface 40 at least a portion 41 of which may be textured for ease of gripping. The body of device 20 is provided with a generally axially extending bore therethrough having a section of first diameter 42 and a section of second diameter 43. At least a portion of the first diameter bore section 42 is provided with threads 44. A doughnut shaped stop surface 45 is located generally at the surface of bore sections 42 and 43 and extends around the second diameter bore section 43 and into axially the first diameter bore section 42.

Figure 3:
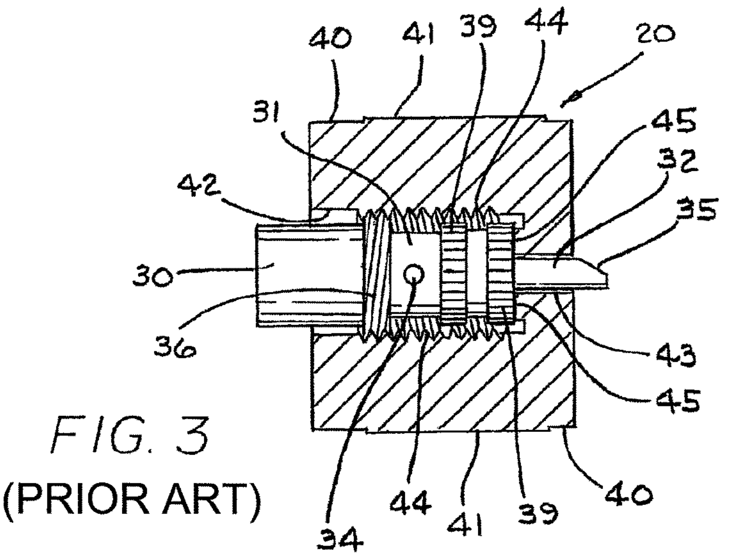
FIG. 3 (PRIOR ART)
FIG. 3 is a view like FIG. 2 showing the connector in the device.

Installation device 20 is used very simply to attach a connector body 27 to an end of a cable 22. After shell 26 has been telescoped onto cable 22, cable 22 may be inserted into connector body 27 until threads 33 begin to engage casing 25. Connector body 27 is then inserted into the first diameter 42 end of the bore in device 20 and body 27 is attached to device 20 by the engagement of threads 36 and 44 via relative rotation of device 20 and body 27. Alternatively, connector body 27 may be threaded into device 20 before it is initially attached to cable 22. As shown in FIG. 3, body 27 is threaded into the bore until the axial end of intermediate portion 31, at outer flange 38, bottoms out and engages stop surface 45. At this point the end 35 of tip portion 32 extends through the second diameter 43 of the bore and thus extends out of the body of device 20. The connector body 27 is now ready and in position to be attached to the casing 25 of cable 22, as now to be described.

With connector body 27 positioned as shown in FIG. 3, the textured portion 41 of the body of installation device 20 is preferably gripped by the user and then the end of cable 22 is inserted into the mouth of the hollow base portion 30 of body connector 27. If connector body 27 has not already been loosely attached to cable 22, as previously described, cable 22 may be held steady and device 20 may be rotated while urging it toward cable 22. Continued rotation causes the threads 33 of base portion 30 to cut threads into, and thus fully engage, casing 25 of cable 22. Rotation of device 20 continues until wire 23 appears at the open end 35 of connector tip portion 32. Such is shown in FIG. 4 which signals the user that the installation is complete and that no further rotation of device 20 is necessary or desirable. At this time, reverse rotation of device 20 releases connector body 27 from device by the interaction of threads 36 and 44. Connector body 27 thus remains attached to the end of cable 22 and the soldering operations may take place at hole 34 and tip open end 35. Then shell 26 may be threaded onto connector body 27 by the interaction of threads 37 and threads 36 to provide the finished product as shown in FIG. 5.

Figure 6:
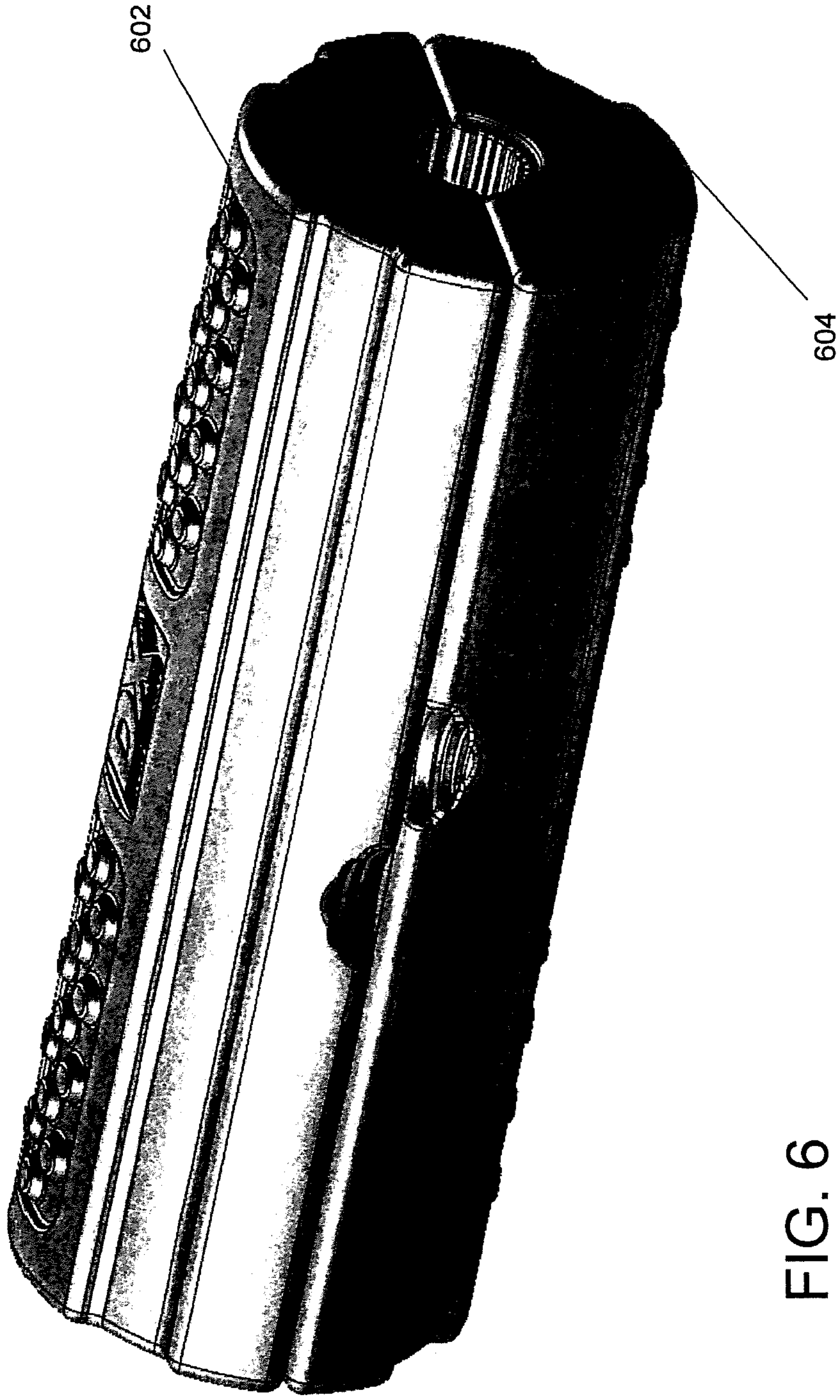
FIG. 6 is a perspective view of a cable gripper tool according to an exemplary embodiment of this disclosure.

FIG. 6 is a perspective view of a cable gripper tool according to an exemplary embodiment of this disclosure. The cable gripper tool is used to grasp a coaxial cable sheath 25, as shown in FIG. 1, for example. The cable gripper tool includes a top half portion 602 and a bottom half portion 604 which can be together (not shown) or completely separable.

To operate the cable gripper tool, a user simply places the two portions, i.e., halfs, of the tool over a coaxial cable to be prepared for installing a connector, etc. As will be further described below, a gripping pattern along an internal bore surface of the tool provides enough friction and/or clamping to enable a user to work with the coaxial cable using less effort than simply grasping the cable with the user's hand. In addition, the cable gripper tool provides a means to straighten a length of cable to prepare the cable for attachment of a connector as previously described.

The gripper tool disclosed herein can be manufactured from a variety of materials, including rubber, PVC (polyvinyl chloride), ABS (acrylonitrile-butadiene-styrene), coated metal, etc.

Figure 7:
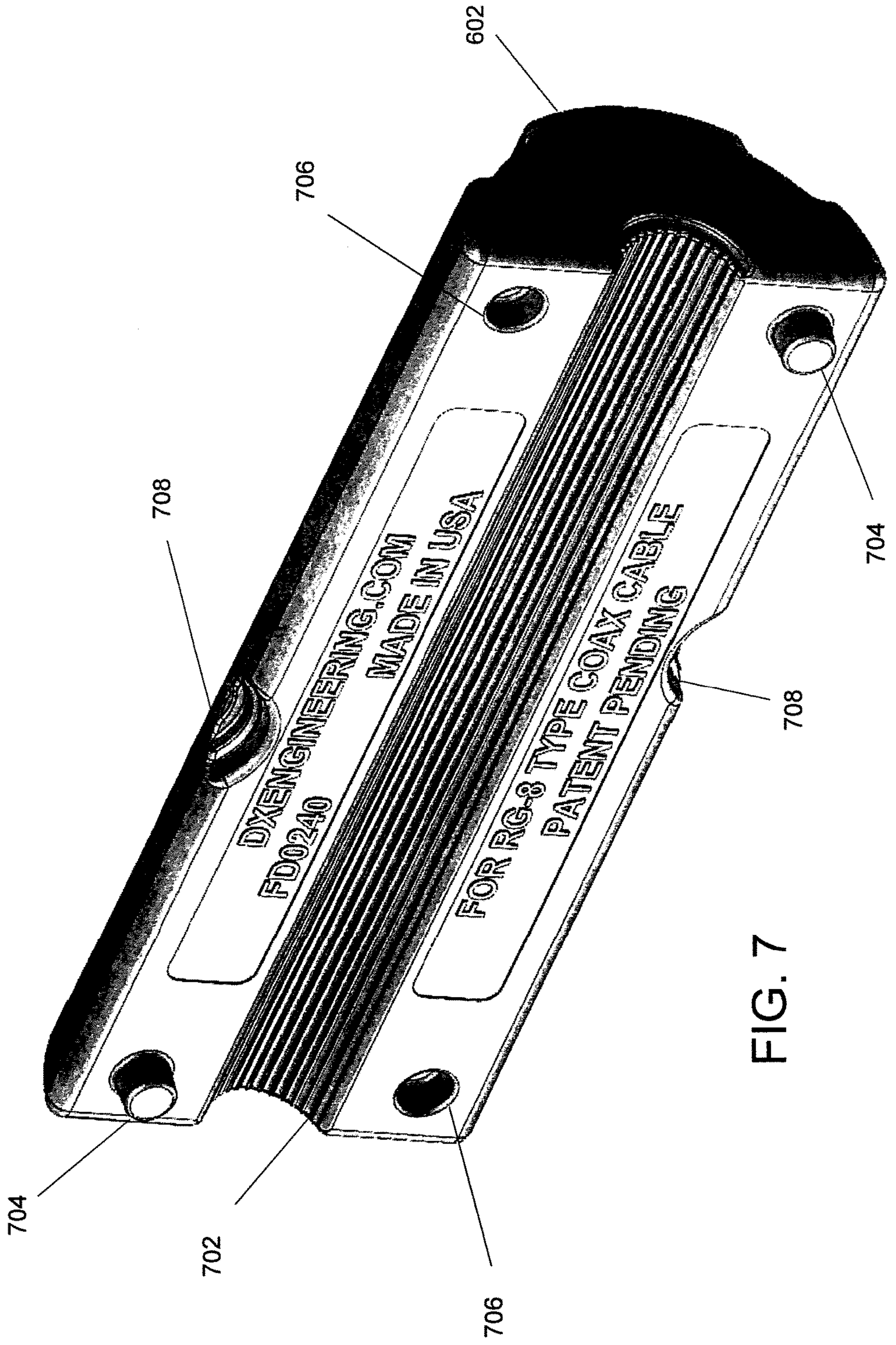
FIG. 7 is a perspective view of one mating part of the cable gripper tool shown in FIG. 6.

FIG. 7 is a perspective view of one mating part of the cable gripper tool shown in FIG. 6. As shown, the cable gripper tool includes a longitudinal bore 702, pins/protrusions 704 and pin/protrusion receiving/sockets 706. In addition, the cable gripper tool includes finger recesses 708 which can be used to separate the mating parts of the tool.

Figure 8:
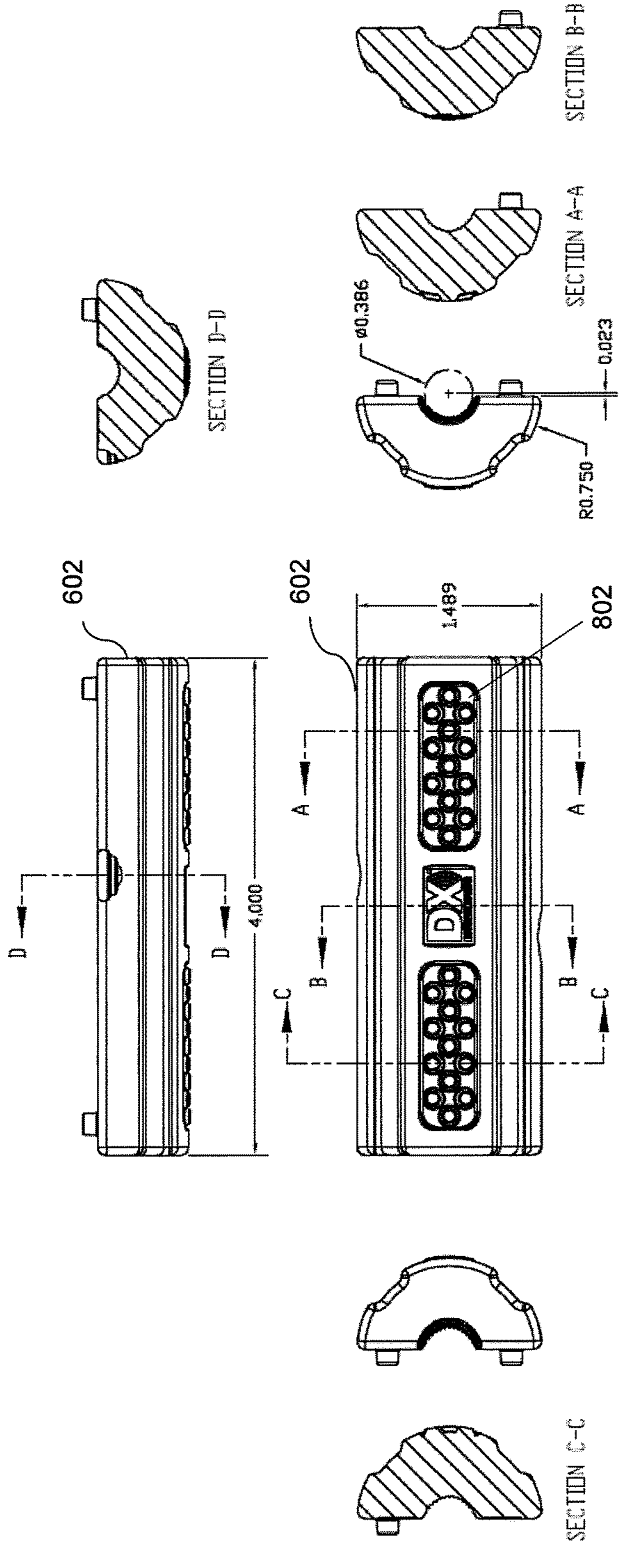
FIG. 8 shows various detail views of one portion of a cable gripper tool configured to accept RG8 coaxial cable according to an exemplary embodiment of this disclosure.

FIG. 8 shows various detail views of one portion 602 of a cable gripper tool configured to accept RG8 coaxial cable according to an exemplary embodiment of this disclosure. As shown, the cable gripper tool includes a patterned surface 802 which provides gripping for a user of the device to work with a gripped coaxial cable.

Figure 9:
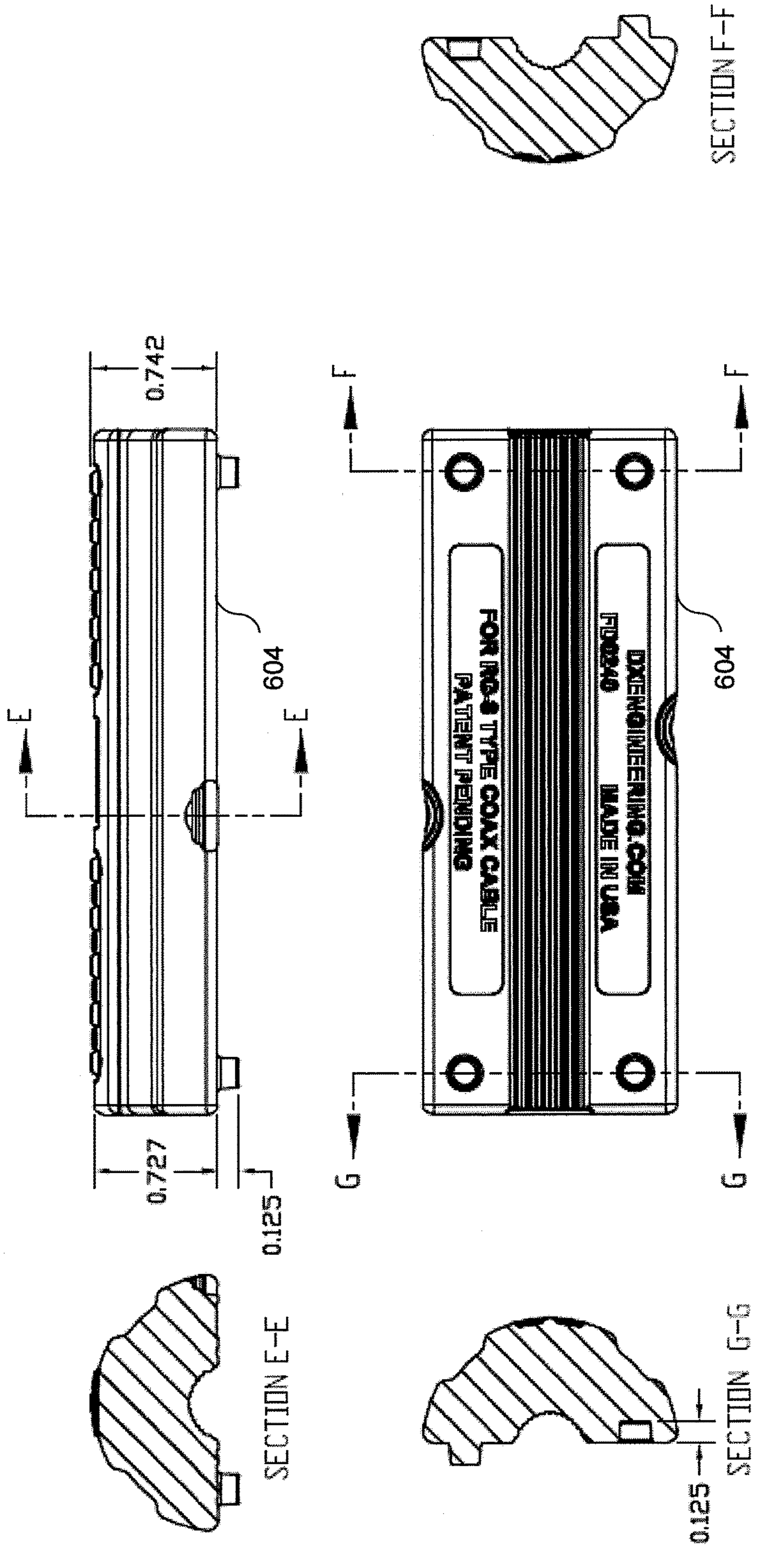
FIG. 9 shows various detail views of a second portion of a cable gripper tool configured to accept RG8 coaxial cable according to an exemplary embodiment of this disclosure.

FIG. 9 shows various detail views of a second portion of a cable gripper tool configured to accept RG8 coaxial cable according to an exemplary embodiment of this disclosure. The second portion illustrated mates with the first portion shown in FIG. 8 where the mating of pin/protrusions and receivers/sockets provide alignment of the first and second portions. In addition, this mating arrangement enables a user to push/pull, i.e., handle, the cable without the gripper tool separating.

Figure 10:
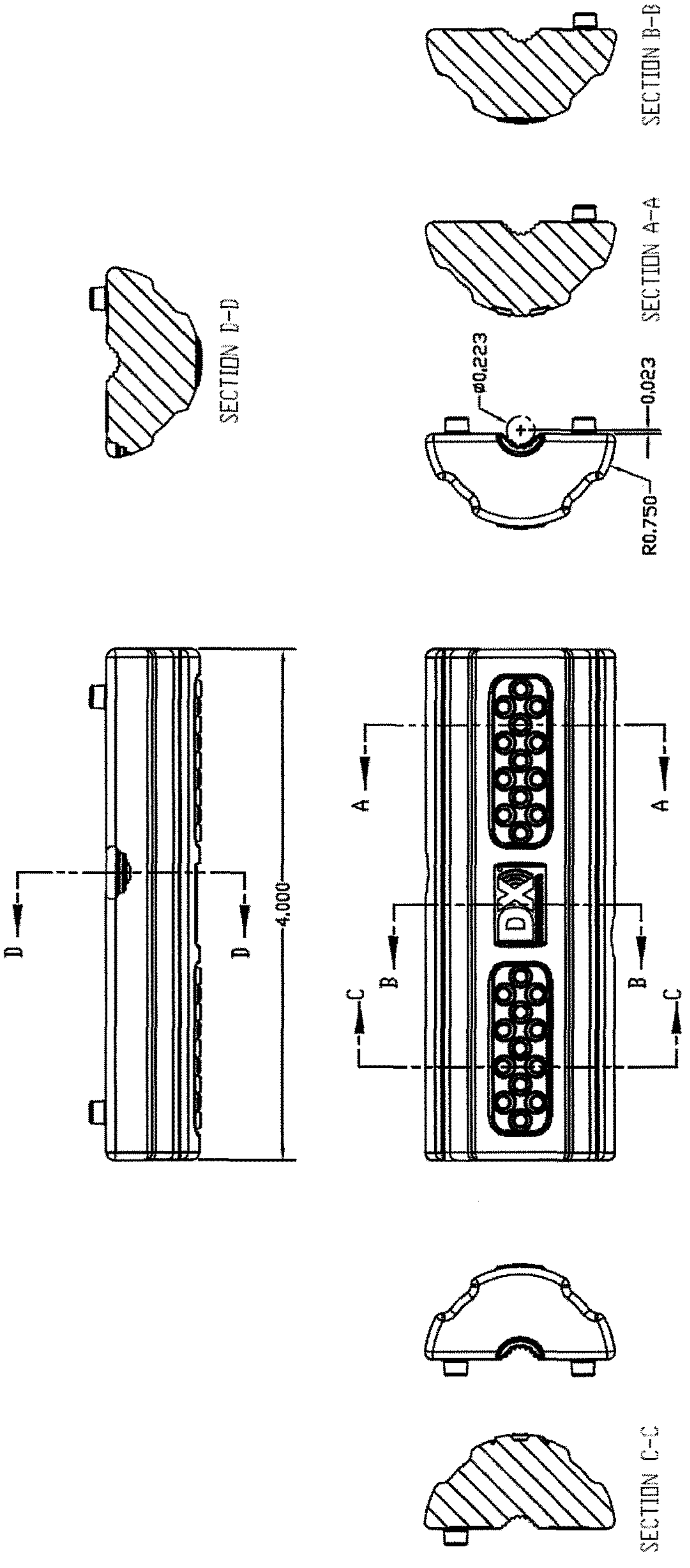
FIG. 10 shows various detail views of one portion of a cable gripper tool configured to accept RG8X coaxial cable according to an exemplary embodiment of this disclosure.

FIG. 10 shows various detail views of one portion of a cable gripper tool configured to accept RG8X coaxial cable according to an exemplary embodiment of this disclosure. As shown, the longitudinal bore dimensions will vary to accommodate a respective size of coaxial cable.

Figure 11:
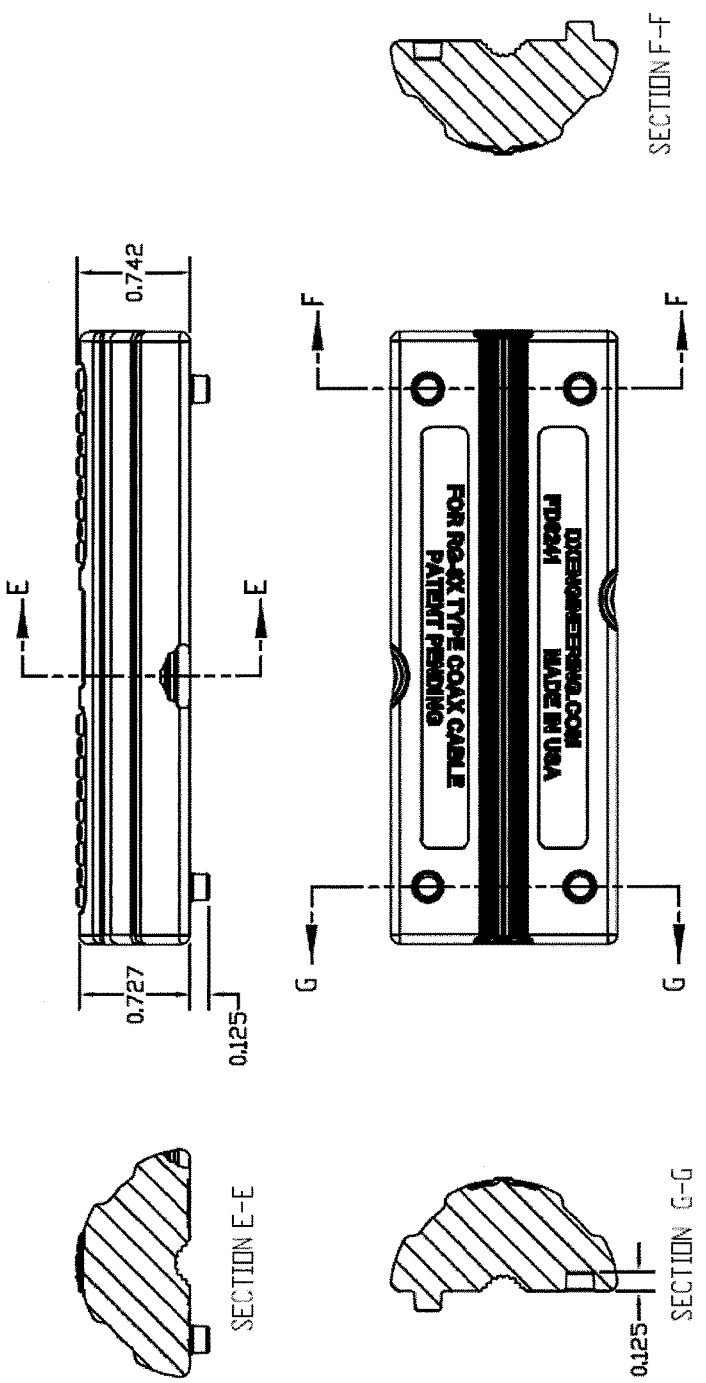
FIG. 11 shows various detail views of a second portion of a cable gripper tool configured to accept RG8X coaxial cable according to an exemplary embodiment of this disclosure.

FIG. 11 shows various detail views of a second portion of a cable gripper tool configured to accept RG8X coaxial cable according to an exemplary embodiment of this disclosure.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A coaxial cable gripping device comprising:

a body including an internal longitudinal bore with a uniform circumference along its entire longitudinal length and configured to receive a section of coaxial cable, the body including a first half portion and a second half portion, and wherein the internal longitudinal bore uniform circumference is less than a uniform circumference of the section of coaxial cable to grasp the section of coaxial cable within the first half portion and the second half portion and provide separation of the first half portion and the second half portion with the section of coaxial cable grasped between the first half portion and second half portion, thereby clamping and straightening the section of coaxial cable between the first half portion and the second half portion, wherein the first half portion and second half portion include finger recesses on an outside surface of the body, an external gripping patterned surface on the outside surface of the body and a cable gripping pattern along an internal bore surface of the internal longitudinal bore, the external gripping surface including a raised textured hand gripping surface on the outside surface of the first and second half portions and the external gripping surface extending substantially along the longitudinal length of the outside surface of the body, the cable gripping pattern including a plurality of continuous longitudinal ridges longitudinally aligned and longitudinally extending along an entire length of the internal longitudinal bore and configured to grip an outer surface of the section of coaxial cable.

2. The coaxial cable gripping device according to claim 1, wherein the gripping device is made of PVC (polyvinyl chloride), rubber or ABS (acrylonitrile-butadiene-styrene).

3. The coaxial cable gripping device according to claim 1, wherein the internal longitudinal bore is configured to receive a section of RG8 or RG8X coaxial cable.

4. The coaxial cable gripping device according to claim 1, wherein the body further includes a first end and a second end, the first and second end each having a flat face oriented at a 90 degree angle relative to the internal bore surface of the longitudinal bore.

5. A coaxial cable gripping device comprising:

a body including an internal longitudinal bore with a uniform circumference along its entire longitudinal length and configured to receive a section of coaxial cable, the body including a first half portion and a second half portion, and wherein the internal longitudinal bore uniform circumference is less than a uniform circumference of the section of coaxial cable to grasp the section of coaxial cable within the first half portion and the second half portion and provide separation of the first half portion and the second half portion with the section of coaxial cable grasped between the first half portion and second half portion, thereby clamping and straightening the section of coaxial cable between the first half portion and second half portion, and a means for clamping the coaxial cable between the first half portion and the second half portion, wherein the first half portion and second half portion include finger recesses on an outside surface of the body, an external gripping patterned surface on the outside surface of the body and a cable gripping pattern along an internal bore surface of the internal longitudinal bore, the external gripping surface including a raised textured hand gripping surface on the outside surface of the first and second half portions and the external gripping surface extending substantially along the longitudinal length of the outside surface of the body, the cable gripping pattern including a plurality of continuous longitudinal ridges longitudinally aligned and longitudinally extending along an entire length of the internal longitudinal bore and configured to grip an outer surface of the section of coaxial cable.

6. The coaxial cable gripping device according to claim 5, wherein the means for clamping is further operative to straighten the section of coaxial cable within the longitudinal bore.

* * * * *